United States Patent [19]

Levin

[11] 4,340,959
[45] Jul. 20, 1982

[54] OPTICAL RECORDING MEDIUM WITH A THICK OVERCOAT

[75] Inventor: Leonard J. Levin, Levittown, Pa.

[73] Assignee: RCA Corporation, New York, N.Y.

[21] Appl. No.: 108,030

[22] Filed: Dec. 28, 1979

[51] Int. Cl.³ .............................................. G11B 7/24
[52] U.S. Cl. ................................. 369/275; 346/135.1;
369/284; 369/288
[58] Field of Search ............... 346/135.1, 76 L;
179/100.1 G, 100.3 V; 358/128.5–128.6;
274/41 R, 41 A, 41.6 R, 41.6 PP, 42 R, 46 R, 46
A, 46 C, 46 D; 369/275–276, 283–286, 288

[56] References Cited

U.S. PATENT DOCUMENTS

| | | | |
|---|---|---|---|
| 2,313,851 | 3/1943 | Van Deventer | 274/46 R |
| 2,340,161 | 1/1944 | Van Deventer | 274/46 R |
| 4,023,185 | 5/1977 | Bloom et al. | 346/135.1 |
| 4,074,282 | 2/1978 | Balas | 346/135.1 |
| 4,097,895 | 6/1978 | Spong | 179/100.3V |
| 4,101,907 | 7/1978 | Bell et al. | 346/135.1 |
| 4,170,616 | 10/1979 | Jebens | 264/1 |

Primary Examiner—Raymond F. Cardillo, Jr.
Attorney, Agent, or Firm—Birgit E. Morris; William J. Burke

[57] ABSTRACT

The invention is an improved optical recording medium and a method for making same in which the substrate has a raised center and peripheral portions. The sides of the raised portions and the upper surface of a light absorptive layer, which overlies the unraised portion, form a mold which is filled with the overcoat material.

11 Claims, 4 Drawing Figures

OPTICAL RECORDING MEDIUM WITH A THICK OVERCOAT

The invention is an optical recording medium having a thick overcoat layer and a method for making same.

BACKGROUND OF THE INVENTION

Spong, U.S. Pat. No. 4,097,895 issued June 27, 1978 and incorporated herein by reference, has disclosed an ablative optical recording medium for use in an optical recording system. The medium comprises a light reflective material which is coated with a layer of a light absorptive organic material. The thickness of the light absorptive layer is chosen so that the reflectivity of the recording medium is reduced. A focused, modulated light beam, such as a light beam from an argon ion laser, when directed at the recording medium vaporizes or ablates the light absorptive layer leaving an opening in this layer and exposing the light reflecting material. Bell, in a co-pending application, Ser. No. 054,437, filed July 3, 1979, which is a continuation of Ser. No. 782,032 filed Mar. 28, 1977, now abandoned, and which is incorporated herein by reference has disclosed an improved ablative trilayer optical recording medium for use in the Spong optical recording system. The trilayer optical recording medium comprises a light reflective layer, a light transmissive layer overlying the light reflective layer, and a light absorptive layer overlying the light transmissive layer. The thickness of the light absorptive layer is so related to the thickness of the light transmissive layer and the optical constants of the light reflective, transmissive and absorptive layers so as to reduce the optical reflectivity of the recording medium. A focused, modulated light beam ablates or melts the light absorptive layer thus exposing the underlying light reflective layer through the light transmissive layer.

The reflectivity in the area of the opening in the light absorptive layer is essentially that of a light reflective layer and is much greater than that of the surrounding, unexposed region. During readout this difference in reflectivity is detected optically and converted into an electrical signal representative of the recorded information.

To eliminate or reduce signal defects or dropouts caused by surface dust which precipitates onto the medium from the environment, a thick overcoat is applied to the light absorptive layer. Dust particles and other surface contaminants which settle on the upper surface of the overcoat layer are thus far removed from the focal plane of the recording lens so that their effect on the recording or playback signal is considerably reduced. Bloom et al, Ser. No. 828,815, filed Aug. 29, 1977, incorporated herein by reference, disclose a thick overcoat with a preferred range of thicknesses from about 0.05 mm to about 1 mm and describe a thick overcoat about 0.08 mm thick formed by spinning techniques. Bell et al, U.S. Pat. No. 4,101,907 issued July 18, 1978 and incorporated herein by reference, disclose an overcoat structure consisting of a thin layer which forms a chemical and thermal barrier between the light absorbing layer and a thick overcoat layer overlying the thin overcoat. The thin overcoat is typically 0.0003 mm thick and is typically formed by evaporation of silicon dioxide. The thick overcoat is typically about 0.1 mm thick and is formed by spinning techniques.

As the thickness of the overcoat layer is increased it becomes more difficult to obtain an overcoat layer by spinning techniques which has a radially uniform thickness because of the increased viscosity of the overcoat material and the slower spinning speeds required. The optimal thickness of the overcoat layer is a balance between the maximum thickness to provide maximum immunity to surface contamination and a minimum thickness to provide a uniform thickness, in order to reduce optical thickness variations, and to minimize manufacturing costs and time. Overcoat layers about 0.18 mm thick are useful since this thickness corresponds to the standard cover glass correction built into commercially available microscope objectives. Thus, it would be desirable to have an alternative method to spinning for forming thick overcoat layers which are uniform in their thickness.

SUMMARY OF THE INVENTION

An overcoated, optical recording medium comprises a substrate, a light reflective layer overlying the substrate, a light absorptive layer overlying the light reflective layer, and a thick overcoat layer overlying the light absorptive layer. The invention is an improved optical recording medium and information record and a method of making said medium and record wherein the improvement comprises a substrate having a major surface which has a center portion and a portion extending about its periphery which are raised above the major surface. The light reflective and light absorptive layers overlie at least a portion of that part of the major surface which is not raised. The upper surface of the light absorbing layer and the sides of the raised central and peripheral portions form a mold in which the overcoat material can be cast and then cured or hardened.

DETAILED DESCRIPTION OF THE INVENTION

Figure 1:
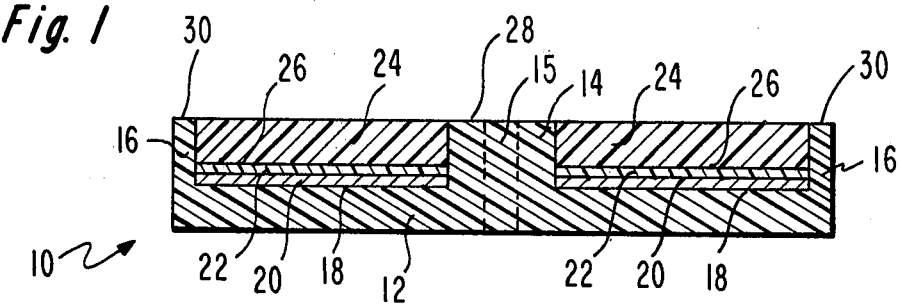
FIG. 1 is a schematic illustration of a cross-sectional view of an overcoated optical recording medium of the invention.

FIG. 1 is a schematic illustration of a cross-sectional view of an improved optical recording medium 10 of the invention which comprises a substrate 12 having a center portion 14 and a peripheral portion 16, extending about the substrate, which are raised above a major surface 18 of the substrate 12. The raised center portion 14 may have an opening 15 extending therethrough to the substrate surface opposed to the major surface 18. A light reflective layer 20 overlies at least a portion of the major surface 18 of the substrate 12. A light absorptive layer 22 overlies the light reflective layer 20 over at least a portion of the major surface 18 which is not raised. An overcoat layer 24 overlies the upper surface 26 of the light absorptive layer 22. Overcoat layer 24 may have a thickness such that its upper surface is coextensive with the upper surface 28 of the raised center portion 14 or the upper surface 30 of the raised peripheral portion 16 or a thickness less than this magnitude.

Figure 2:
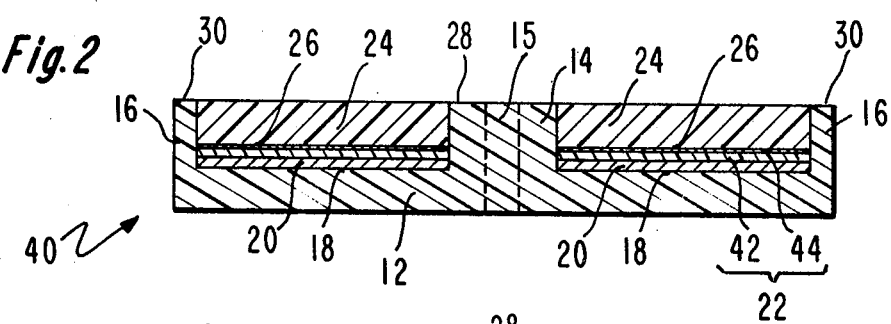
FIG. 2 is a schematic illustration of a cross-sectional view of an overcoated optical recording medium of the invention having a trilayer optical recording structure.

FIG. 2 is a schematic illustration of a cross-sectional view of an overcoated optical recording medium 40. The identification of the elements of the medium 40 corresponds to those of FIG. 1 except that the light absorptive layer 22 is comprised of two layers: a spacer layer 42 and an absorptive layer 44.

Figure 3:
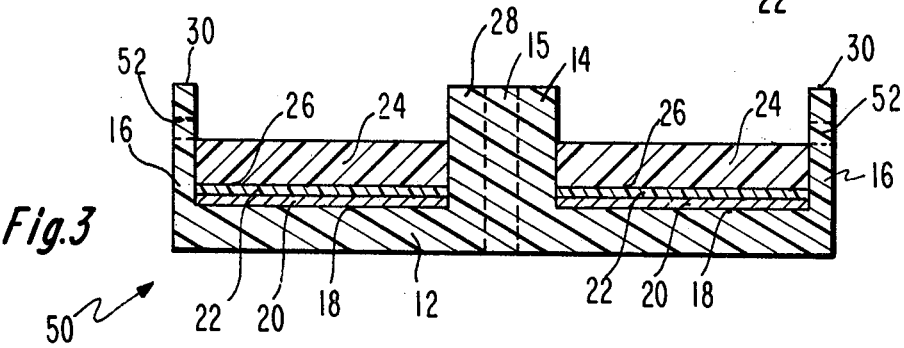
FIG. 3 is a schematic illustration of a cross-sectional view of a second embodiment of the overcoated optical recording medium of the invention wherein openings have been formed in the raised peripheral portion of the substrate.

FIG. 3 is a schematic illustration of a cross-sectional view of a second embodiment 50 of the improved overcoated optical recording medium of the invention. The identification of the elements of the second embodiment 50 are the same as those for the first embodiment 10 shown in FIG. 1 except for the openings or slots 52 in the raised peripheral portion 16 of the substrate 12.

Figure 4:
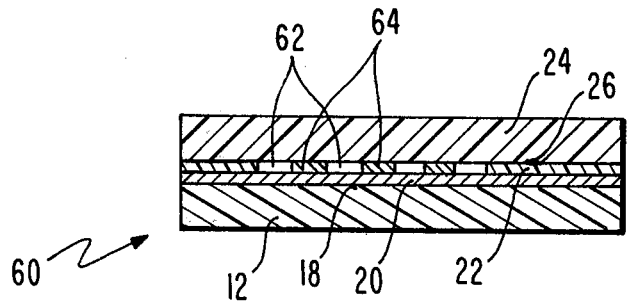
FIG. 4 is a schematic illustration of a cross-sectional view of a portion of an overcoated information record of the invention having information recorded therein.

FIG. 4 is an illustrative embodiment of an overcoated information record 60 of the invention with information recorded therein. The identification of the elements of the information record 60 correspond to those of the recording medium 10 of FIG. 1. The FIGURE schematically illustrates a section of the recording medium in which an information track has been recorded in the form of a series of openings 62 and light absorptive layer 22. Typically, information is recorded in the medium by varying the length of the openings 62 and of the unexposed areas 64 of the light absorptive layer 22 between the openings 62 along the direction of a track. The length of the openings 62 are determined by the length of the time that the recording medium is exposed to the recording light beam and the speed at which the recording medium is moving through the focal plane of the recording light beam.

The substrate 12 may be comprised of a metal, which is machined, or a plastic material, such as polyvinylchloride, which is injection or compression molded, into the shape shown in FIGS. 1, 2 and 3. The raised center portion 14 and the raised peripheral portion 16 extend a distance above the major surface 18 at least as great as the sum of the thickness of the light reflective and absorptive layers, and the overcoat layer 24 plus any additional layers. Preferably the height of the raised portions 14 and 16 above the major surface 18 are equal. A center opening 15 extending through the raised center portion for mounting the substrate on the spindle may be present.

In the second embodiment of the invention 50 there are shown radially directed openings or slots 52 extending through the raised portion 16 of the substrate 12. The radially directed openings 52 are located a distance above the major surface 18 equal to the desired height of the combination of the light reflective, absorptive and overcoat layers above the major surface 18. The function of these openings will be described more fully below.

The thickness of the substrate 12 need only be sufficient to support the remainder of the structure.

Any roughness of the surface 18 of the substrate 12 on the scale of the focused light beam diameter will produce noise in the signal channel during readout. The interposition of a non-conformal coating of a plastic material such as an epoxy resin between the major surface 18 and the light reflective layer 20 will produce a microscopically smooth surface and eliminate this noise source.

The light reflective layer 20 reflects a substantial fraction of the light incident at the recording or readout wavelength, preferably at least 30 percent, and is typically formed of a metal such as aluminum or gold which exhibits high reflectivity. The reflective layer 20, which is typically about 30 to 60 nanometers thick, may be deposited on the surface 18 of the substrate 12 using vacuum evaporation techniques.

The light absorptive layer must be absorbing at the wavelength used for recording and readout and must form a smooth, amorphous, coherent, continuous, optically clear film. The thickness of the light absorptive layer may be chosen such that the reflectivity of the recording medium is reduced. Further, the light absorptive layer should be readily ablatable at low temperatures to form clearly defined openings.

The light absorptive layer 22 may be comprised of an organic dyestuff such as 4-phenylazo-1-naphthylamine, as disclosed by Bloom et al in U.S. Pat. No. 4,023,185 issued May 10, 1977 and incorporated herein by reference, phthallocyanine dyes including lead phthallocyanine, chloroaluminum phthallocyanine, vanadyl phthallocyanine, stannic phthallocyanine, and Pt-bis(dithio-α-diketone) complexes having phenyl or substituted phenyl groups.

Alternatively, a light transmissive layer may be interposed between the light reflective layer and the light absorptive layer as shown in FIG. 2. Suitable light transmissive materials include silicon dioxide, aluminum oxide, magnesium fluoride and lead fluoride, and plastic materials such as fluorocarbon and hydrocarbon polymers. The thickness of the light transmissive layer is at least 10 nanometers, typically between about 10 nanometers and 500 nanometers and preferably between about 30 nanometers and 100 nanometers. The light absorptive layer is typically a metal between about 2 nanometers and about 25 nanometers thick. The metal may be selected from a group consisting of titanium, platinum, rhodium, gold, nickel, chromium, manganese, vanadium, or selenium, tellurium or alloys thereof.

Preferably the reflectivity of the reflective layer 20 and the absorptive layer 22 is less than 30 percent.

The overcoat layer 26 should be substantially transmissive and non-scattering at the wavelength used for recording and readout and should be stable under ambient conditions. When information is recorded in the absorptive layer 22 the overcoat should allow formation of the information elements and readout without substantially affecting reproducibility of the recorded information. Silicone resins such as General Electric's RTV 615 and RTV 602 and Dow Corning's Sylgard 184 form suitable overcoat materials. Room temperature or radiation cured epoxy resins are also suitable overcoat materials.

The overcoat layer may be between about 0.05 millimeters and about 1 millimeter thick, with the effectiveness of the overcoat layer increasing with increasing thickness. In the optical recording medium of the invention the thickness of the overcoat layer depends upon the amount of material dispensed into the mold formed by the sides of the center and peripheral raised portions until the level of such material reaches the top of these portions or the level of the openings in the raised portions, as shown in FIG. 3.

A barrier layer which is either thermally insulating or chemically unreactive or both, may be interposed between the light absorptive layer 22 and the overcoat layer 24. Bell et al, U.S. Pat. No. 4,101,907, incorporated herein by reference, describe such barrier layers.

Attempts to overcoat a substrate as shown in FIGS. 1 or 3 using a spinning technique can result in a non-uniform overcoat of the optically sensitive area. In particular, as the overcoat material spreads radially outward, it piles up against the inner wall of the raised peripheral portion producing a radially increasing thickness of the overcoated layer with the thinnest overcoat near the side of the raised center portion.

A uniform overcoat thickness is required for the present application since the light beam focus servomechanism responds to differences in the spacing between the focal plane of the light beam and the light reflective layer. This difference is typically detected as a change in the optical path length of the light beam or as a change in the value of a capacitor in which the overcoat layer forms part of the dielectric. Since the optical and low frequency dielectric constants of the overcoat material differ from those of air, variations in the thickness of the overcoat will lead to an error in the determination of the position of the light absorptive layer. This will result in a light beam not focused on the light absorptive layer which leads to decreased recording sensitivity and frequency response of the recording medium.

The optical recording medium disclosed herein uses the raised center and peripheral portions and the major surface, coated with the light reflective and absorptive layers, as the three sides of a mold into which the overcoat material is cast. In the embodiment shown in FIG. 1, the thickness of the resultant overcoat is controlled by the amount of the material dispensed onto the major surface until the overcoat thickness equals the height of the raised portions. Thus, the use of the improved substrate of the invention provides a method by which an overcoated optical recording medium with a uniform and reproducible thickness can be fabricated. The thickness of the overcoat layer is simply controlled by controlling the amount of material dispensed into the mold up to the point where the material spills over the raised peripheral portion.

The method of fabricating an overcoated optical recording medium comprises the following steps: (a) forming a substrate having raised central and peripheral portions; (b) forming the light reflective layer on the unraised portion of the major surface; (c) forming a light absorptive layer overlying the light reflective layer; (d) forming the overcoat layer by dispensing the desired amount of the overcoat material into the mold formed by the side walls of the raised portions and the light absorptive layer; (e) curing or hardening the overcoat material. A light transmissive layer may be interposed between the light reflective and absorptive layers, if desired. A chemical and thermal barrier layer may be interposed between the light absorptive and overcoat layers, if desired.

In the second embodiment as shown in FIG. 3, the thickness of the overcoat depends upon the amount of material dispensed upon the major surface until the material fills this mold to the height of the openings or slots in the peripheral raised portion. Any excess material will then spill out through the slots. The advantage of the second embodiment is that the control of maximum thickness which the first embodiment provides is retained while the upper surfaces of the raised portions can be used to provide further protection, when the recording media are stacked, if this should be desired.

After the mold is filled with the overcoat material it must be kept in a level position until the overcoat material cures or hardens, otherwise a side-to-side gradient in the overcoat thickness will result. An alternative method of fabricating the overcoat layer which minimizes this problem is to fill the mold to the height of the raised portions and then clamp a plate having a flat surface, which may be coated with a suitable mold release agent, against the upper surfaces 28 and 30 of the raised portions before curing or hardening. This plate is then removed after the curing or hardening step.

Another alternative method is to use an approach similar to that disclosed by Jebens, U.S. Pat. No. 4,170,616 issued Oct. 9, 1979 and incorporated herein by reference, wherein a vacuum casting method was used to fabricate a thin Fresnel lens on a glass substrate. To fabricate an overcoated optical recording medium, the flat surface of a plate, which may be coated with a mold release agent, is placed against the upper surfaces 28 and 30 of the raised portions of the substrate. The ambient pressure in the chamber formed by the substrate and the plate is then reduced using vacuum means. The chamber is then filled with the overcoat material, preferably using the same tube as was used for the pressure reduction. Since the pressure differential between the chamber and the ambient becomes zero when the chamber is filled, distortions of the substrate or plate which might cause variations in the overcoat thickness are eliminated. After the overcoat material is cured or hardened the flat plate is removed.

I claim;

1. In an optical recording medium for use in an optical recording and readout system employing light of a certain wavelength which comprises:
   a substrate having a major surface;
   a light reflective layer, which reflects a substantial portion of light incident thereon at said wavelength, overlying at least a portion of said major surface;
   a light absorptive layer, which absorbs light at said wavelength, overlying said light reflective layer; and
   an overcoat layer, which is substantially transmissive of light at said wavelength, overlying said light absorptive layer;
   the improvement which comprises a substrate having a major surface, which has a center portion and a portion extending about said substrate periphery raised a distance above said major surface;
   wherein said light reflective layer and said light absorptive layer overlie at least a portion of said major surface which is not raised and said overcoat layer overlies said light absorptive layer and wherein said raised peripheral portions contain one or more openings extending radially therethrough and extending upwards a distance from a point above the surface of said light absorptive layer.

2. An optical recording medium according to claim 1 wherein the height of said raised portions above said major surface of said substrate is between about 0.05 millimeter and about 1 millimeter.

3. An optical recording medium according to claim 1 wherein said substrate is comprised of a plastic material.

4. An optical recording medium according to claim 1 wherein said light reflective layer is a metal between about 30 nanometers and 60 nanometers thick.

5. An optical recording medium according to claim 4 wherein said light absorptive layer is an organic material whose thickness is adjusted such that the reflectivity from said recording medium is reduced.

6. An optical recording medium according to claim 4 wherein a light transmissive layer, at least 10 nanometers thick, is interposed between said light reflective layer and a light absorptive layer wherein the optical constants of said reflective, transmissive and absorptive layers and the thicknesses of said transmissive and absorptive layers are such that the reflectivity of said recording medium at said wavelength is less than about 0.3.

7. An optical recording medium according to claim 6 wherein the thickness of said transmissive layer is between about 10 nanometers and 500 nanometers thick and said absorptive layer is between about 2 nanometers and 25 nanometers thick.

8. An optical recording medium according to claim 6 wherein said light transmissive layer is comprised of a material selected from a group consisting of silicon dioxide, aluminum oxide, magnesium fluoride, lead fluoride and plastic materials and wherein said light absorbing layer is comprised of a material selected from a group consisting of titanium, platinum, rhodium, gold, nickel, chromium, bismuth, manganese, vanadium selenium, alloys thereof, tellurium and alloys thereof.

9. An optical recording medium according to claim 1 wherein the thickness of said overcoat layer is between about 0.05 millimeter and about 1 millimeter.

10. An optical recording medium according to claim 9 wherein said overcoat layer is comprised of a material selected from the group consisting of silicone resins and epoxy resins.

11. An optical recording medium according to claim 9 wherein a thermally and chemically insulating barrier layer is interposed between said light absorbing layer and said overcoat layer.

* * * * *